H. L. BARTLETT.
TESTING DEVICE FOR ELECTRIC CURRENT TRANSLATING DEVICES, FUSES, &c.
APPLICATION FILED FEB. 11, 1914.

1,139,832.

Patented May 18, 1915.
2 SHEETS—SHEET 1.

Witnesses
M. H. Gannett
John J. McCarthy

Inventor
Howard L. Bartlett

By Victor J. Evans
Attorney

UNITED STATES PATENT OFFICE.

HOWARD LEE BARTLETT, OF DEVILS LAKE, NORTH DAKOTA.

TESTING DEVICE FOR ELECTRIC-CURRENT-TRANSLATING DEVICES, FUSES, &c.

1,139,832.   Specification of Letters Patent.   Patented May 18, 1915.

Application filed February 11, 1914. Serial No. 818,088.

*To all whom it may concern:*

Be it known that I, HOWARD L. BARTLETT, a citizen of the United States, residing at Devils Lake, in the county of Ramsey and State of North Dakota, have invented new and useful Improvements in Testing Devices for Electric - Current - Translating Devices, Fuses, &c., of which the following is a specification.

This invention relates to improvements in testing devices for electric current translating devices, fuses, etc., whereby the electrical conductivity thereof may be readily determined.

In carrying out the present invention, it is my purpose to provide a testing device whereby the electrical conductivity of lamps, in closed and plug fuses, and the like may be readily ascertained and which will embrace the desired features of simplicity, efficiency and durability.

It is also my purpose to provide a device of the type set forth which will embody comparatively few parts and these so correlated and arranged as to eliminate the possibility of injuring the device.

Furthermore, I aim to provide a testing device of the type set forth which may be readily and conveniently carried about from place to place and which, when in use, will require but little space.

With the above and other objects in view, the invention consists in the construction, combination and arrangement of parts hereinafter set forth in and falling within the scope of the claim.

Figure 1:
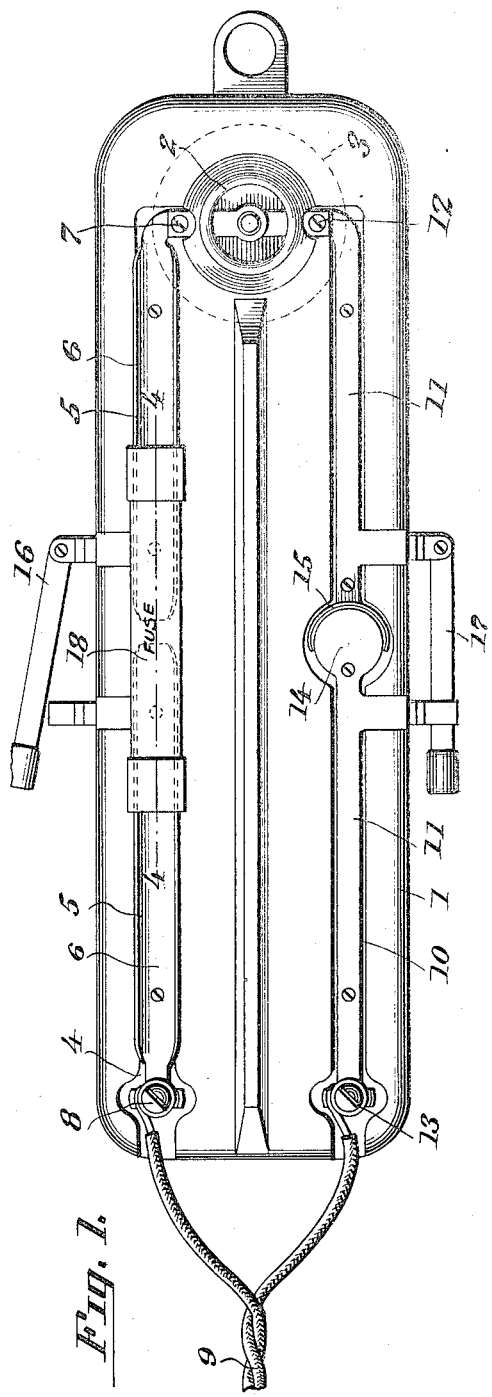
Figure 2:
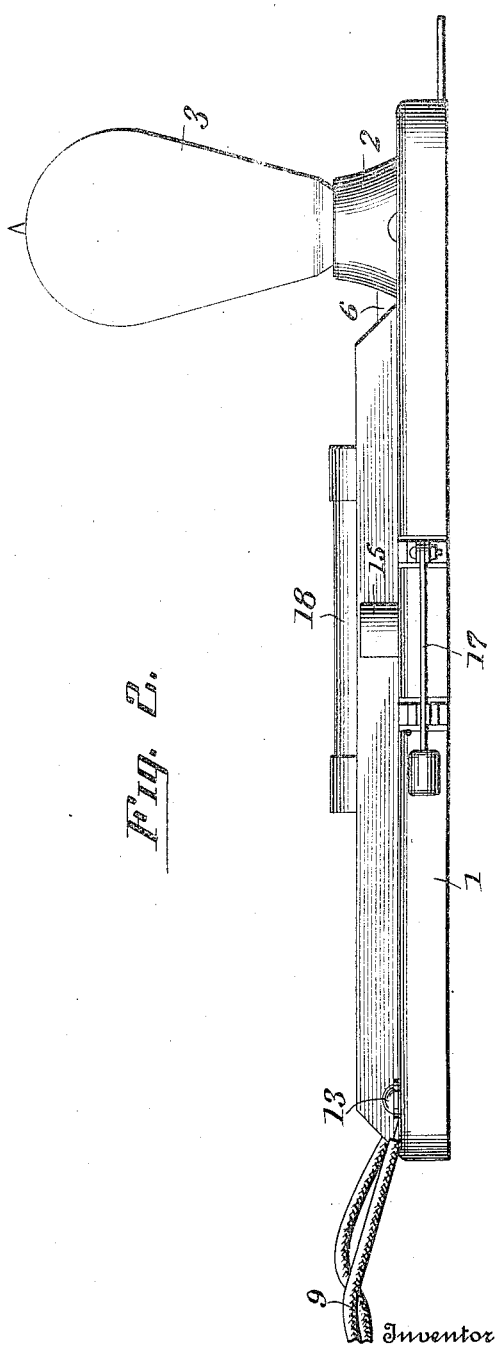
Figure 3:
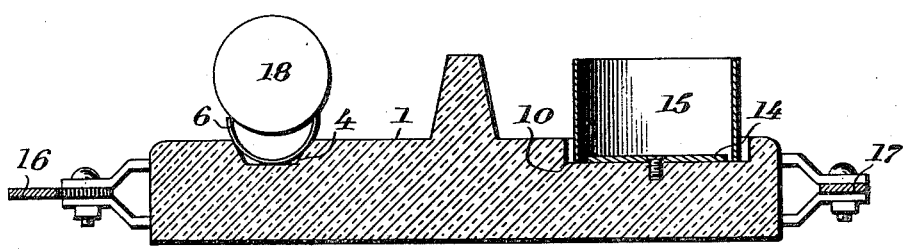
Figure 4:
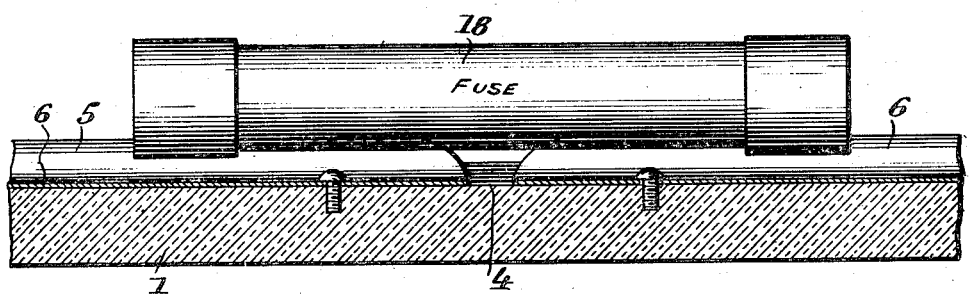
Figure 5:
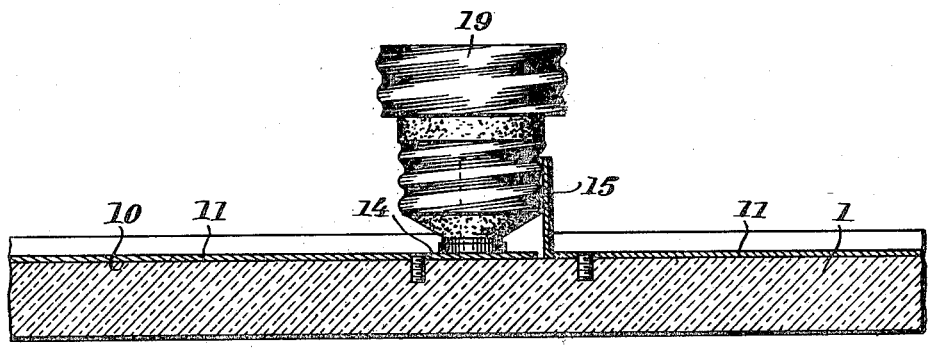

In the accompanying drawings; Figure 1 is a top plan view of a testing device constructed in accordance with my present invention. Fig. 2 is a view in edge elevation of the same. Fig. 3 is a cross sectional view therethrough. Fig. 4 is a fragmentary longitudinal sectional view on the line 4—4 of Fig. 1 showing the contacts designed to receive an inclosed fuse on an enlarged scale. Fig. 5 is a fragmentary sectional view through the device showing the contacts designed to receive a plug fuse on an enlarged scale.

Referring now to the drawings in detail, 1 designates a base composed of insulating material and preferably of rectangular contour. Set into the base or otherwise connected thereto at one end thereof is an electric lamp socket 2 adapted to receive an electric lamp bulb 3. Formed in the upper surface of the base 1 adjacent to one longitudinal edge thereof and parallel with such edge is a groove 4 and set into such groove is a set of contacts 5 comprising, in the present instance, plates 6, 6 concavo-convex in cross section and having the adjacent ends thereof spaced apart. The outer end of one of the plates is electrically connected with one side of the lamp socket 2 as at 7, while the similar end of the other plate is equipped with a binding post 8 adapted to receive the terminal of one wire of an electric circuit 9.

Formed in the base adjacent to the opposite longitudinal edge thereof is a groove 10 and lying within the groove are contact strips 11, 11 having the adjacent ends thereof suitably spaced apart. The outer end of one of the strips 11 is electrically connected to the remaining side of the lamp socket 2 as at 12, while the outer end of the other strip 11 is equipped with a binding post 13 receiving the remaining wire of the electric circuit 9. In the present instance, the inner end of one of the strips 11 is connected with a metallic disk 14 suitably fastened to the base 1, while the adjacent end of the other strip is connected with a partially circular plate 15 outstanding from the base 1 and partially inclosing one edge of the disk 14 and spaced apart therefrom. Extending outwardly from the longitudinal edge of the base 1 adjacent to the contacts 5 and electrically connected with such contacts at the adjacent ends of the latter are the contacts of a single blade single throw knife switch 16, while extending outwardly from the opposite longitudinal edge of the base and electrically connected with the contact strips 11, 11 at the adjacent ends thereof are the contacts of a knife switch 17.

In practice, the contacts 5 are designed to receive an inclosed fuse, as 18, while the disk 14 and plate 15 on the confronting ends of the contact strips 11, 11 are adapted to receive a plug fuse as 19. When it is desired to test a fuse as the inclosed fuse 18, such fuse is placed within the concaved faces of the plates 6, 6 and bridges the adjacent ends of such plates, while the switch 16 is opened and the switch 17 closed. A test lamp bulb is threaded into the socket 2 as illustrated and the current in the circuit 9 switched on. If the inclosed fuse is intact, current will flow from one side of the circuit 9, through the bridged plates 6, 6, the test lamp 3 and back to the other side of the circuit by way of the contact strips 11, 11 and the closed switch 17. Thus, the lamp will be illuminated to indicate that the fuse is intact. On the other hand, when it is desired to test a plug fuse the switch 16 is closed and the switch 17 opened and the plug fuse, as 19, engaged with the disk 14 and plate 15 thereby bridging the strips 11, 11 independently of the switch 17. If the plug fuse is capable of conducting an electric current, the lamp 3 will be again illuminated, current flowing from one side of the circuit 9, through the contact plates 6, 6 and switch 16, the test lamp and then back to the other side of the circuit by way of the contact strips 11, 11, plate 15, fuse and disk 14. Should it be desired to test a lamp, the lamp bulb is removed from the socket 2 and a plug fuse placed therein, while the switch 16 is closed and the switch 17 opened and the bottom terminal on the plug of the lamp bulb engaged with the disk 14 and the threaded wall of the plug of the lamp bulb engaged with the plate 15. If the lamp filament is intact the same will be illuminated, current flowing as just described.

From the foregoing description taken in connection with the accompanying drawings, the construction, mode of operation and manner of employing my invention will be readily apparent. It will be seen that I have provided a testing device whereby fuses, lamps and analogous electric current receiving devices may be readily and conveniently tested.

While I have herein shown and described one preferred form of my invention by way of illustration, I wish it to be understood that I do not limit or confine myself to the precise details of construction described and delineated, as modification and variation may be made within the scope of the claim without departing from the spirit of the invention.

I claim:

In a testing device, a base of insulating material having grooves formed therein adjacent to the opposite longitudinal edges thereof, a lamp socket connected to the base at one end thereof between the adjacent ends of said grooves, a test lamp within said socket, contacts connected with one side of said lamp and disposed within one of said grooves and spaced apart and adapted to be bridged by an element to be tested, a second set of contacts connected with the other side of said lamp and spaced apart and disposed within the remaining groove and adapted to be bridged by an element to be tested, and switches extending outwardly from the opposite longitudinal edges of said base, one switch for each set of contacts whereby the sets of contacts may be used independently of each other.

In testimony whereof I affix my signature in presence of two witnesses.

HOWARD LEE BARTLETT.

Witnesses:
R. GOER,
J. W. EATON.